United States Patent
Crochon et al.

(10) Patent No.: US 7,319,844 B2
(45) Date of Patent: Jan. 15, 2008

(54) SYSTEM COMPRISING A PLURALITY OF DEVICES THAT CAN BE ADDRESSED BY RADIO FREQUENCY, AND METHOD FOR ADDRESSING BY ACTIVATION OF A TRANSPARENT MODE

(75) Inventors: Elisabeth Crochon, Poisat (FR); Yann Têtu, Grenoble (FR); Jacques Reverdy, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/569,266

(22) PCT Filed: Sep. 13, 2004

(86) PCT No.: PCT/FR2004/002317

§ 371 (c)(1),
(2), (4) Date: Feb. 23, 2006

(87) PCT Pub. No.: WO2005/029403

PCT Pub. Date: Mar. 31, 2005

(65) Prior Publication Data

US 2006/0284726 A1    Dec. 21, 2006

(30) Foreign Application Priority Data

Sep. 16, 2003  (FR) .................................. 03 10858

(51) Int. Cl.
*H04B 7/00*    (2006.01)

(52) U.S. Cl. ..................... 455/41.2; 370/328; 370/338; 340/10.1; 340/10.3; 340/10.42

(58) Field of Classification Search ............... 455/41.2; 370/338, 328; 340/10.1, 10.3, 10.42, 10.52
See application file for complete search history.

(56) References Cited

U.S. PATENT DOCUMENTS

| 5,621,913 A | 4/1997 | Tuttle et al. |
| 6,121,544 A * | 9/2000 | Petsinger ..................... 174/353 |
| 2002/0119770 A1* | 8/2002 | Twitchell, Jr. ............... 455/422 |

FOREIGN PATENT DOCUMENTS

WO    WO 01/94967 A2    12/2001

* cited by examiner

*Primary Examiner*—Matthew Anderson
*Assistant Examiner*—Tuan Pham
(74) *Attorney, Agent, or Firm*—Oliff & Berridge, PLC.

(57) ABSTRACT

Each device (1*a*, 1*b*, 1*c*) comprises a processing circuit connected to a first antenna (4), designed to be coupled to an external antenna (3, 5), and a second antenna (5) designed to be coupled to an antenna (4) of a higher-ranking device (1). The system comprises a reading unit and devices (1) having a predetermined ranking. The first antenna (4*a*) of the rank one device (1*a*) is coupled to an antenna (3) of the reading unit. Addressing by the reading unit of a device (1*c*) ranking higher than one is performed by means of the associated lower-ranking devices (1*a*, 1*b*). A device (1*a*1) of predetermined ranking is associated with a sub-set (8*a*) of higher-ranking devices (1*b*11, 1*b*12) so as to form a hierarchical tree structure.

9 Claims, 4 Drawing Sheets

SYSTEM COMPRISING A PLURALITY OF DEVICES THAT CAN BE ADDRESSED BY RADIO FREQUENCY, AND METHOD FOR ADDRESSING BY ACTIVATION OF A TRANSPARENT MODE

BACKGROUND OF THE INVENTION

The invention relates to an identification system comprising a plurality of devices able to be addressed by radio frequency by a reading unit comprising a reading antenna, each device comprising a processing circuit connected to a first antenna, designed to be coupled to an external antenna, energy recovery means and a second antenna designed to be coupled to an antenna of at least one higher-ranking device, the processing circuit comprising means for applying radio frequency signals to the terminals of the second antenna, each device having a predetermined ranking, the external antenna to which the first antenna of the rank one device is coupled being the reading antenna and at least two devices of adjacent rankings being arranged in such a way as to establish an electromagnetic coupling between the first antenna of a device of ranking higher than one and the second antenna of the lower-ranking device.

STATE OF THE ART

The use of RFID (radio frequency identification) type contact-less labels enables all the objects equipped with such a label present in the field of the reading antenna to be identified. In order to be able to identify the labels in all spatial positions and orientations, the reading antenna is generally complex and presents a three-dimensional structure. Typically, the active field is relatively large (about one m$^3$) and identification is successively performed along the three axes to activate all the labels. This identification method is well suited for identification of objects in bulk. The position of the objects is in fact, in this case, unknown and the spatial organization of the objects is not fixed. A problem encountered with this method is the loss of any information as to the relative arrangement of the labels present in the field of the reader with respect to one another. Moreover, this contact-less identification method may present range limits.

The document WO0194967, for example, describes a system for locating RFID type devices and RFID type labels. A label is linked to a main computer by means of one of said devices. The device communicates with the label by means of a radio frequency communication channel and with the main computer by means of another radio frequency communication channel. The device comprises an antenna for each of the communication channels. Such a device may be connected to the main computer by means of another of the devices or of several other devices.

OBJECT OF THE INVENTION

It is an object of the invention to remedy these shortcomings and, in particular, to enable objects to be located with respect to one another, in particular objects arranged according to a hierarchical order.

According to the invention, this object is achieved by the appended claims and, in particular, by the fact that a device of pre-determined ranking is associated with a sub-set of higher-ranking devices in such a way as to form a hierarchical tree structure.

It is also an object of the invention to achieve a method for addressing the devices of the system, addressing by the reading unit of a device of ranking higher than one being performed by means of the associated lower-ranking devices.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
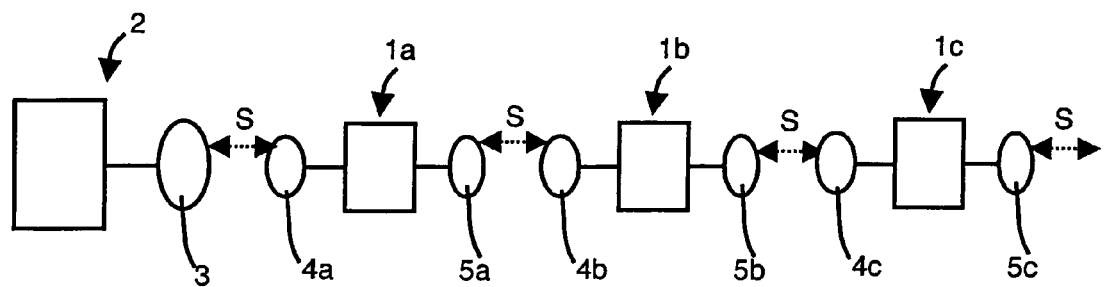
FIG. 1 represents a particular embodiment of an identification system according to the invention.

In FIG. 1, three devices 1 (respectively 1a, 1b and 1c) able to be addressed by radio frequency by a reading unit 2 receive signals S transmitted by the reading antenna 3 of the reading unit 2. Each device 1 comprises a first antenna 4 (respectively 4a, 4b and 4c) coupled to an external antenna, and a second antenna 5 (respectively 5a, 5b and 5c) designed to be coupled to an antenna of a higher-ranking device. Thus, the external antenna whereto the first antenna 4a of the device 1a, of rank one, is coupled, is the reading antenna 3, whereas the first antennas 4b and 4c of the devices 1b and 1c, respectively of rank two and three, are respectively coupled to the second antennas 5a and 5b of the devices 1a and 1b of adjacent lower ranking.

In FIG. 1, a transparent mode of all the devices 1 is activated. Each device 1 in transparent mode transmits the signals S received on its first antenna 4 to its second antenna 5 and retransmits the signals it receives on its second antenna 5 to its first antenna 4. Thus, the signals S are transmitted by each of the devices 1 to the device of adjacent ranking in both directions. Addressing of a device 1 ranking higher than one by the reading unit 2 can thus be performed by means of the associated lower-ranking devices 1. By successively activating transparent mode of the devices according to their ranking, the position of each of the devices can be determined with respect to the other devices of the system.

Figure 2:
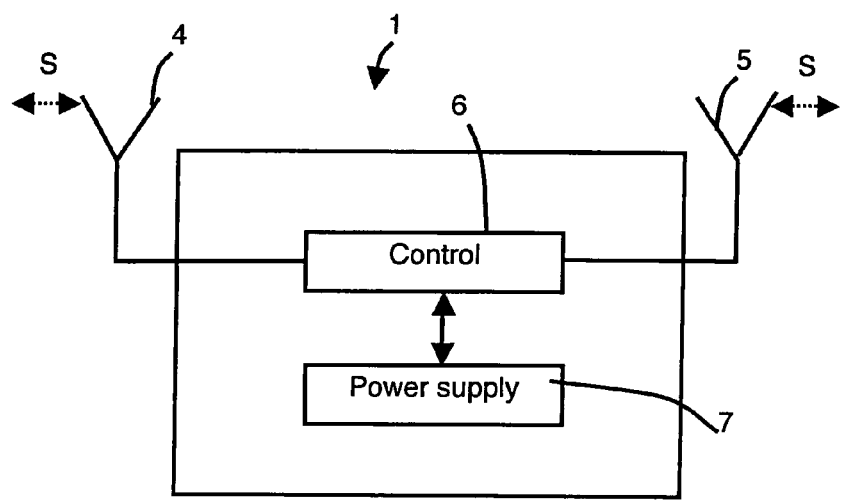
FIG. 2 schematically illustrates a particular embodiment of a device able to be addressed by radio frequency of a system according to the invention.

As represented in FIG. 2, the device 1 comprises a processing circuit 6 (control circuit) and an energy recovery circuit 7, these circuits being able to be formed, for example, by an integrated circuit. Thus, each device 1 can receive electromagnetic energy by means of its first antenna 4 to supply its processing circuit and, by means of its second antenna 5, to supply the associated higher-ranking devices. In FIG. 2, transparent mode of the device 1 is activated and the processing circuit 6 therefore applies the radio frequency signals S received on its first antenna 4 to the terminals of its second antenna 5.

The invention presents, in particular, an advantage for a system comprising a plurality of devices 1 attached to objects arranged according to a predetermined spatial order, for example in the field of supermarkets, libraries and archives, where the objects, in particular the goods, books or files, are stored in space according to an order, for example in hierarchical order.

Figure 3:
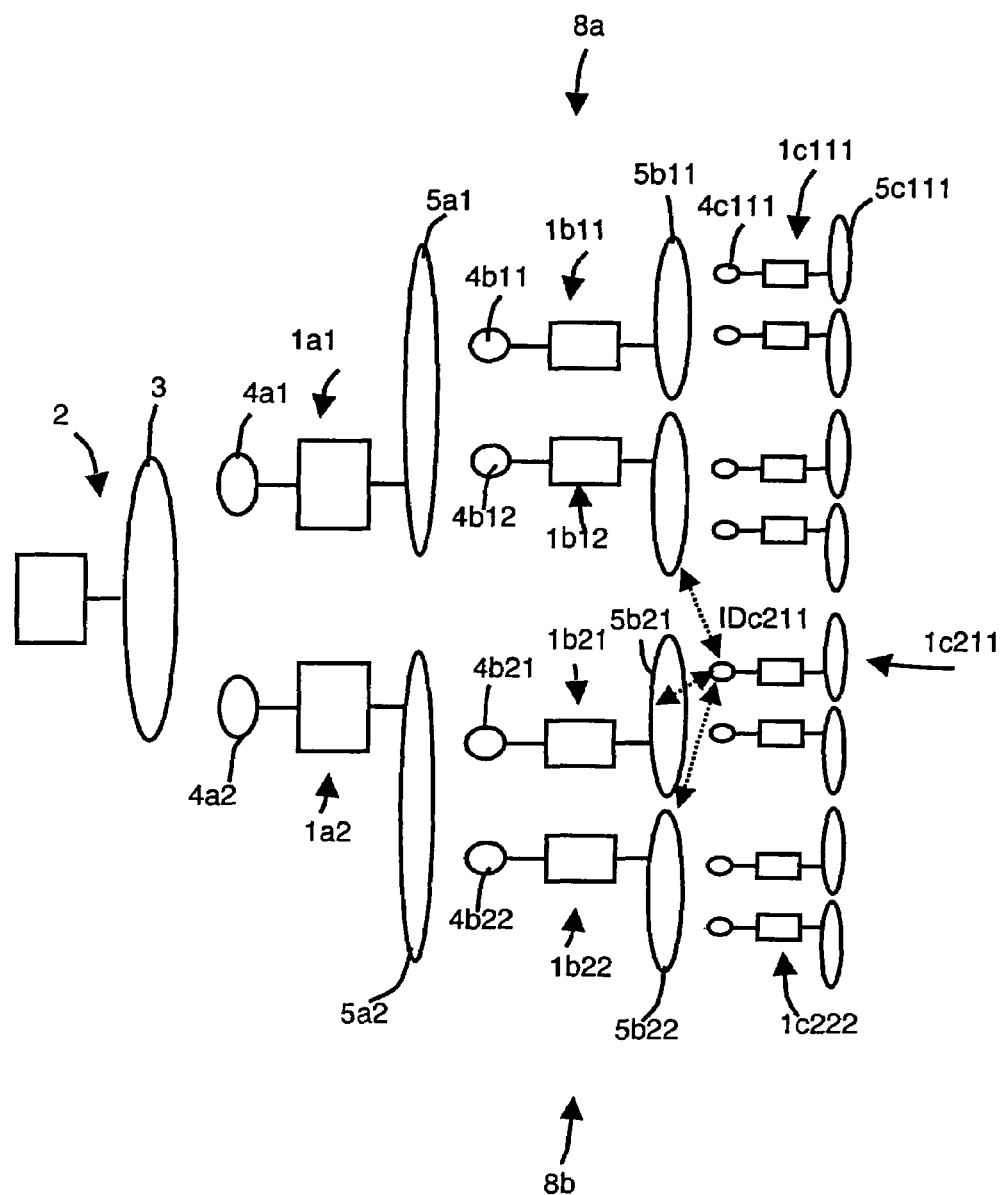
FIG. 3 schematically illustrates the hierarchical tree structure of a particular embodiment of a system according to the invention.

The system represented in FIG. 3 comprises two rank one devices 1*a* (respectively 1*a*1 and 1*a*2), four rank two devices 1*b* (respectively 1*b*11, 1*b*12, 1*b*21 and 1*b*22) and eight rank three devices 1*c*. A device 1 of predetermined ranking is respectively associated with a sub-set 8*a*, 8*b* of two higher-ranking devices 1 so as to form a hierarchical tree structure. Thus, the rank one devices 1*a*1 and 1*a*2 are both associated with two rank two devices 1*b* (respectively 1*b*11 and 1*b*12 on the one hand and 1*b*21 and 1*b*22 on the other hand). Likewise, each rank two device 1*b*11 to 1*b*22 is associated with two rank three devices 1*c* (1*b*11 is associated with 1*c*111 and 1*c*112, 1*b*12 with 1*c*121 and 1*c*122, 1*b*21 with 1*c*211 and 1*c*212, and 1*b*22 with 1*c*221 and 1*c*222). So that the second antenna 5*a* of a rank one device 1*a* (1*a*1, respectively 1*a*2) is only coupled with the first antennas 4*b* (4*b*11 and 4*b*12, respectively 4*b*21 and 4*b*22) of the associated rank two devices 1*b*, the devices 1*b* (1*b*21 and 1*b*22, respectively 1*b*11 and 1*b*12) not associated with the device 1*a* are located spatially distant from the device 1*a* (1*a*1, respectively 1*a*2). The antennas of the devices of non-adjacent ranking, for example the second antennas 5*a* of the devices 1*a* and the first antennas 4*c* of the devices 1*c*, are also located spatially distant so as to minimize the electromagnetic coupling between them.

Figure 4:
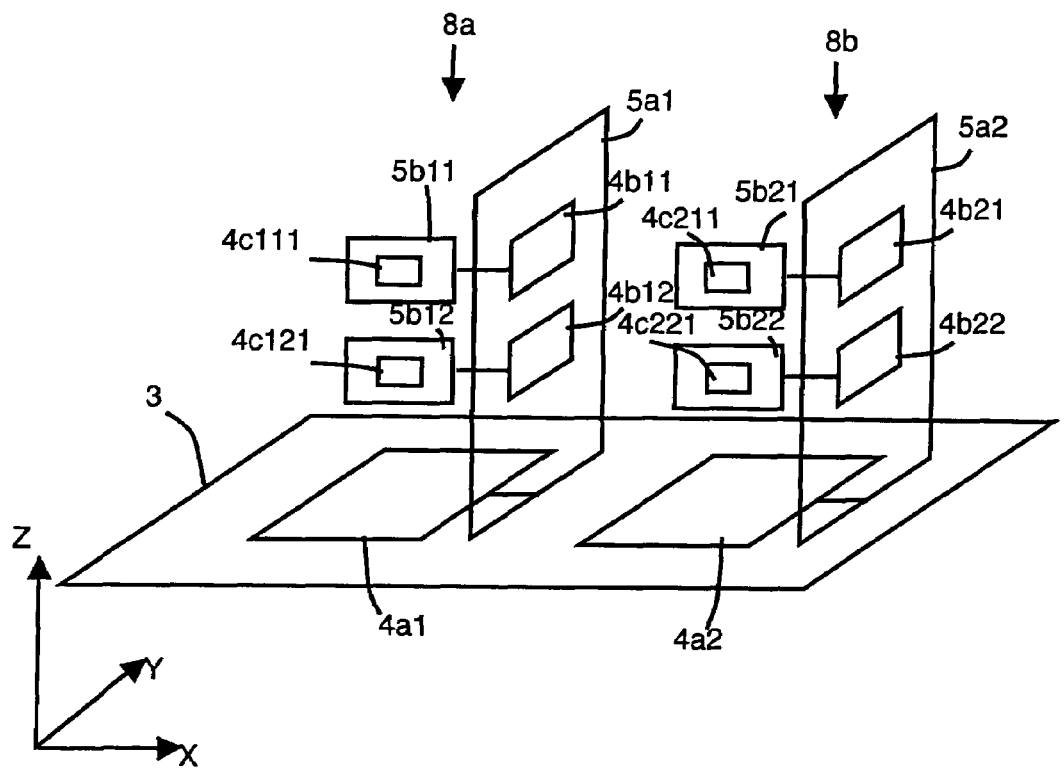
FIG. 4 illustrates in perspective the orientations and positions of the antennas of a particular embodiment of a system according to the invention.

In the particular embodiment represented in FIG. 4, each antenna 3, 4 and 5 is a flat antenna, schematically represented by a rectangle. Devices 1 having substantially flat antennas can for example be attached to recipients in the field of goods distribution. For example, the devices 1*a* can be attached to pallets, the devices 1*b* to collective packaging and the devices 1*c* to the packaging of individual products. In this case, the collective packaging can be interpreted as the content of the pallets and as containing the individual products.

In FIG. 4, the reading antenna 3 and the associated first antennas 4*a*1 and 4*a*2 are arranged in two close planes, parallel to the XY plane of a Cartesian reference frame defined by the axes X, Y and Z, so as to establish an electromagnetic coupling between them. The second antenna 5*a*1 (respectively 5*a*2) of a rank one device 1*a* and the associated first antennas 4*b*11 and 4*b*12 (respectively 4*b*21 and 4*b*22) of the rank two devices 1*b* are arranged in two close planes, parallel to the YZ plane, so as to establish an electromagnetic coupling between the associated antennas. The second antennas 5*b*11, 5*b*12, 5*b*21 and 5*b*22 of all the rank two devices 1*b* are arranged in the same plane, parallel to the XZ plane and close to a parallel plane in which all the first antennas 4*c* of the rank three devices 1*c* are arranged, so as to establish an electromagnetic coupling between the respectively associated antennas. In the particular embodiment represented in FIG. 4, the antennas 4 and 5 of one and the same device are orthogonal. Moreover, the second antennas 5 of a device are parallel to the first antennas of the lower-ranking devices. Furthermore, the antennas of two devices 1*a* and 1*c* of non-adjacent ranking are arranged orthogonally in space so as to minimize the electromagnetic coupling between them.

As previously in FIG. 3, the first antennas 4*b*11 and 4*b*12 of the devices of the sub-set 8*a*, associated with the device 1*a*1, are substantially isolated, by their distance in space, from the second antenna 5*a*2 of the non-associated lower-ranking device 1*a*2.

Figure 5:
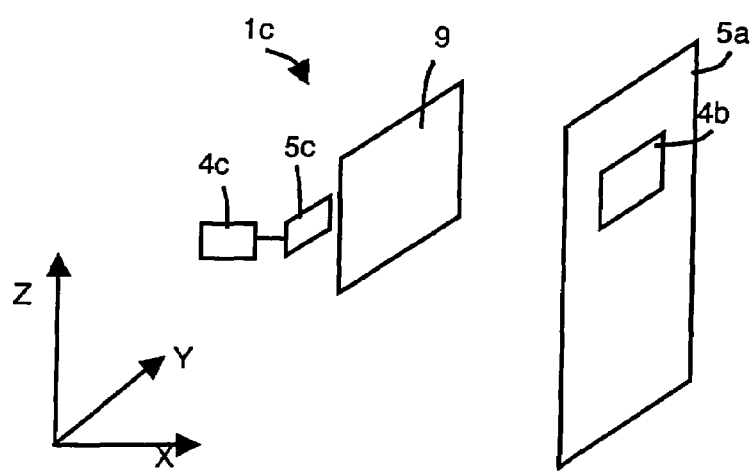
FIG. 5 represents a particular embodiment of an electromagnetic shield and of its position with respect to a device according to the invention.

In another particular embodiment of a system according to the invention, represented in FIG. 5, a rank three device 1*c* comprises an electromagnetic shield 9 enabling its second antenna 5*c*, designed to be coupled to a first antenna of a rank four device, to be isolated from the parallel first antennas 4*b* of the associated device 1*b* and from the also parallel second antennas 5*a* of the associated device 1*a*. The electromagnetic shield 9 can for example be formed by a wall doubled with ferrite. The wall, placed in parallel manner to the associated antenna, enables the electromagnetic field lines to be channelled and to radiate on one side only.

During the addressing method of the devices of the system, the reading unit 2 transmits an electromagnetic field in the direction of the devices 1*a* the first antennas 4*a* whereof are coupled to the reading antenna 3. The reading unit 2 supplies the data and the energy if necessary to supply each device, via associated lower-ranking devices configured in transparent mode.

Figure 6:
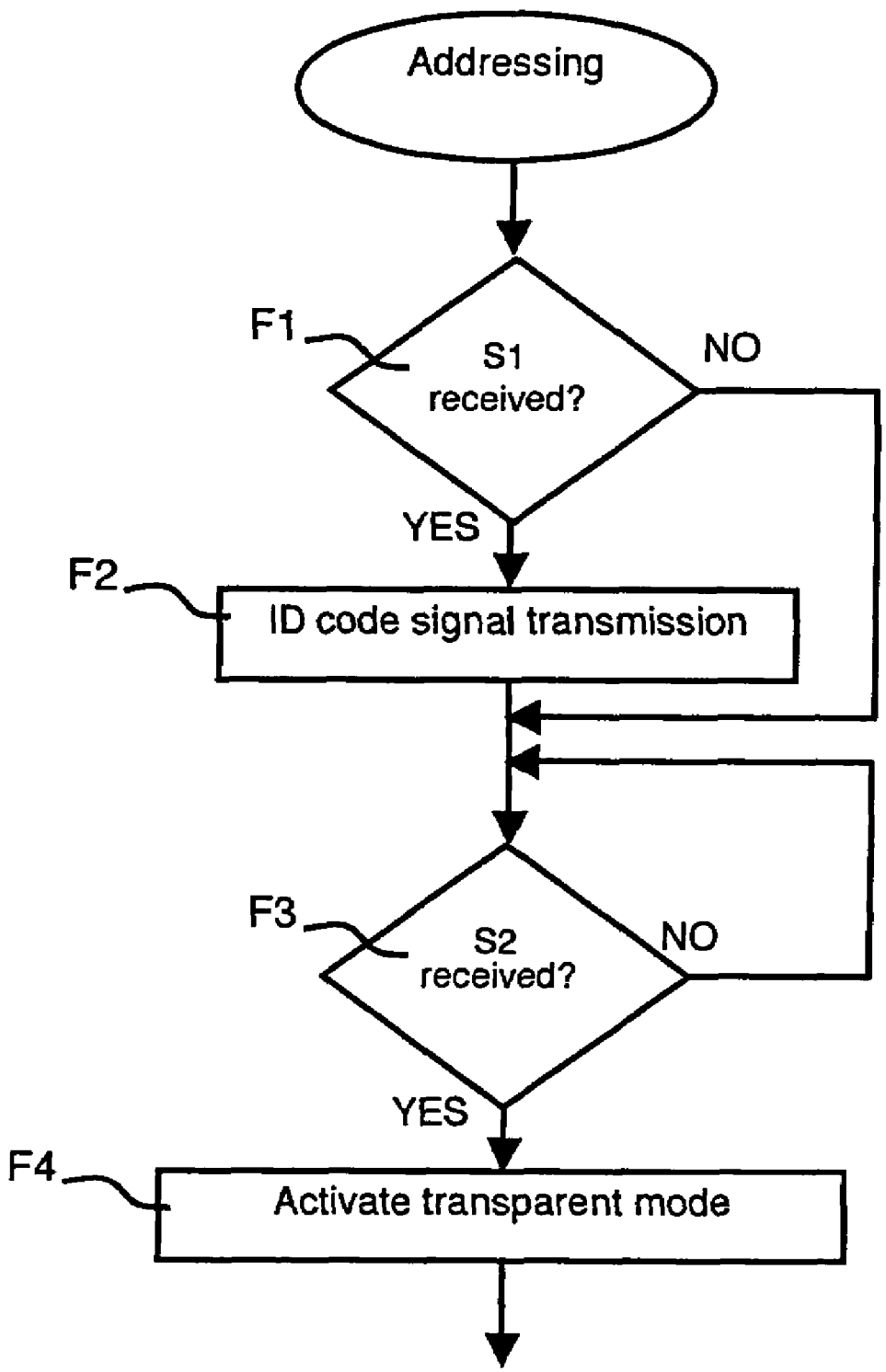
FIG. 6 shows a flowchart of a particular embodiment of the addressing method according to the invention.

In a particular embodiment of an addressing method, represented in FIG. 6, each device 1 has a unique identification code ID. The reading unit 2 transmits identification request signals S1. As illustrated in FIG. 6, each device 1 checks, in a step F1, whether it has received a signal S1 and transmits, in a step F2, a signal SID representative of its identification code ID when it receives an identification request signal S1 (YES output of F1). After the step F2 or when the device 1 does not receive an identification request signal (NO output of F1), each device 1 checks, in a step F3, whether it has received a transparent mode activation signal S2. Then, in a step F4, it checks activation of transparent mode on receipt of a transparent mode activation signal S2 (YES output of F3). The transparent mode activation signals S2 are transmitted by the reading unit 2 and are selectively intended for each of the predetermined devices 1. If no transparent mode activation signal S2 is received (NO output of F3), the device 1 continues to check, in the step F3, whether it has received a transparent mode activation signal S2.

The method for addressing enables an identification request signal S1 to be sent to all the devices 1 of the same ranking when all the lower-ranking devices 1 are in transparent mode. In the case where no device 1 is in transparent mode, only the rank one devices 1 receive the signals S transmitted by the reading unit 2.

It is also possible to activate transparent mode of a single device of a specific ranking and to identify only the higher-ranking devices associated with this lower-ranking device which is in transparent mode. To activate transparent mode of a single device of a specific ranking, the signal SID representative of the identification code of the target device can be transmitted in association with the transparent mode activation signal S2. Thus, each device receiving the signals S2 and SID compares its identification code ID with the code represented by the signal SID and only activates its transparent mode if these codes are identical. Then, by activating transparent mode of a single higher-ranking device, only the associated devices of higher ranking than said higher ranking are identified. Thus, a predetermined high-ranking device can be identified quickly without activating all the devices of the non-associated sub-sets.

For example, the reading unit 2 supplies all the rank one devices 1a and sends them an identification request signal S1. All the devices 1a present in the electromagnetic field emitted by the reading unit 2 and coupled by means of their first antennas 4a to the reading antenna 3 transmit the signal SID representative of their identification code. Then the reading unit 2 selects a specific device 1a (1a1 or 1a2 for example) from the previously identified rank one devices 1a and sends the transparent mode activation signal S2 to this device. The device 1a selected (1a1 in the example chosen) controls activation of its transparent mode so as to apply a radio frequency electromagnetic field to the terminals of its second antenna 5a, thus supplying only the rank two devices 1b (1b11 and 1b12 in the example chosen) belonging to the associated sub-set.

Then the reading unit 2 transmits an identification request signal S1 intended for the rank two devices 1b (1b11 and 1b12, for example) belonging to the sub-set associated with the selected device 1a (1a1 in the example chosen). The identification request signal S1 is transmitted to the corresponding devices 1b by means of the selected device 1a. Each device 1b receiving this signal (1b11 and 1b12 in the example chosen) then sends a signal SID representative of its identification code to the reading unit 2 by means of the selected device 1a. All the other, non-selected, devices 1 remain mute. Then the reading unit 2 selects a device 1b (for example 1b11) from the previously identified rank two devices 1b and sends the transparent mode activation signal S2 to this device. In the same way as in the previous steps, the reading unit 2 continues identification of a rank three device 1c (for example 1c111), by means of the associated devices 1a and 1b.

The method for addressing can comprise an error correction procedure when the same identification code ID is nevertheless transmitted by means of several devices 1 of the same ranking. For example, the rank three device 1c211 (FIG. 3) transmits its identification code IDc211 by means of three rank two devices, for example by the devices 1b12, 1b21 and 1b22. The position of the device transmitting the code IDc211 is then not determined univocally. The error correction procedure enables the identification code IDc211 to be associated with the device 1c211 coupled to the device 1b21 that is located in the middle of the three rank two devices 1 having transmitted said identification code IDc211, which in the example represented gives the correct position. In practice, the identification code is then associated with the device the closest to the centre of gravity of the different devices concerned.

As the arrangement and orientation in space of the different antennas designed to be coupled are selected in such a way as to obtain optimum coupling, the electromagnetic power emitted by the reading unit 2 can be lower than that necessary in known devices.

The invention claimed is:

1. Identification system comprising a plurality of devices able to be addressed radio frequency by a reading unit comprising a reading antenna, each device comprising a processing circuit connected to a first antenna, designed to be coupled to an external antenna, energy recovery means and a second antenna designed to be coupled to an antenna of at least one higher-ranking device, the processing circuit comprising means for applying radio frequency signals to the terminals of the second antenna, each device having a predetermined ranking, the external antenna to which the first antenna of the rank one device is coupled being the reading antenna and at least two devices of adjacent rankings being arranged in such a way as to establish an electromagnetic coupling between the first antenna of a device of ranking higher than one and the second antenna of the lower-ranking device, system wherein a device of specific ranking is associated with a sub-set of higher-ranking devices so as to form a hierarchical tree structure, wherein addressing by the reading unit of a device ranking higher than one is performed by means of the associated lower-ranking devices, wherein, each device having a unique identification code, the reading unit transmits identification request signals, each device transmits a signal representative of its identification code when it receives an identification request signal, the reading unit transmits transparent mode activation signals selectively intended for at least one previously identified device, the device in transparent mode transmitting the signals received on its first antenna to its second antenna and retransmitting the signals it receives on its second antenna to its first antenna.

2. Identification system comprising a plurality of devices able to be addressed radio frequency by a reading unit comprising a reading antenna, each device comprising a processing circuit connected to a first antenna, designed to be coupled to an external antenna, energy recovery means and a second antenna designed to be coupled to an antenna of at least one higher-ranking device, the processing circuit comprising means for applying radio frequency signals to the terminals of the second antenna, each device having a predetermined ranking, the external antenna to which the first antenna of the rank one device is coupled being the reading antenna and at least two devices of adjacent rankings being arranged in such a way as to establish an electromagnetic coupling between the first antenna of a device of ranking higher than one and the second antenna of the lower-ranking device, system wherein a device of specific ranking is associated with a sub-set of higher-ranking devices so as to form a hierarchical tree structure, wherein addressing by the reading unit of a device ranking higher than one is performed by means of the associated lower-ranking devices, further comprising an error correction procedure when the same identification code is transmitted by means of several devices of the same ranking.

3. System according to claim 2, wherein the error correction procedure associates said identification code with a device coupled to the device located in the middle of said devices of the same ranking having transmitted said identification code.

4. An identification system comprising a plurality of devices able to be addressed by radio frequency by a reading unit comprising a reading antenna, each device comprising:

a processing circuit connected to a first antenna, designed to be coupled to an external antenna, energy recovery means and a second antenna, orthogonal to said first antenna and designed to be coupled to an antenna of at least one higher-ranking device, the processing circuit comprising means for applying radio frequency signals to the terminals of the second antenna, each device having a predetermined hierarchical ranking corresponding to a predetermined spatial order of objects to which said devices are respectively attached, the external antenna to which the first antenna of the rank one device is coupled being the reading antenna and at least two devices of adjacent rankings being arranged in such a way as to establish an electromagnetic coupling between the first antenna of a device of ranking higher than one and the second antenna of the lower ranking device, a device of specific ranking being associated with a sub-set of higher-ranking devices so as to form a hierarchical tree structure, the second antenna of a device being parallel to the first antennae of the associated lower ranking devices.

5. System according to claim 4, wherein the antennas of two devices of non-adjacent rankings are arranged in space in such a way as to minimize the electromagnetic coupling between them.

6. System according to claim 4, comprising electromagnetic shields.

7. System according to claim 4, comprising a plurality of devices of the same ranking, the first antennas of all the devices of the same ranking having one and the same spatial orientation and the second antennas of all the devices of the same ranking having one and the same spatial orientation.

8. System according to claim 7, wherein the first antennas of the devices of a sub-set are substantially isolated from the second antennas of the non-associated lower-ranking devices.

9. System according to claim 4, wherein addressing by the reading unit of a device ranking higher than one is performed by means of the associated lower-ranking devices.

* * * * *